United States Patent
Malik et al.

(10) Patent No.: US 7,460,543 B2
(45) Date of Patent: Dec. 2, 2008

(54) METHOD AND SYSTEM FOR SCHEDULING TRAFFIC IN A WIRELESS NETWORK

(75) Inventors: Rahul Malik, Singapore (SG); Wei Lih Lim, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 1008 days.

(21) Appl. No.: 10/639,458

(22) Filed: Aug. 13, 2003

(65) Prior Publication Data
US 2005/0036466 A1 Feb. 17, 2005

(51) Int. Cl.
*H04L 12/28* (2006.01)
(52) U.S. Cl. ............... 370/395.4; 370/395.2; 370/400; 370/422; 370/432; 370/458; 370/235; 370/338
(58) Field of Classification Search . 370/395.4–395.42, 370/235, 338, 349, 395.2, 400, 422, 432, 370/445, 458, 498, 278, 282, 345
See application file for complete search history.

(56) References Cited

U.S. PATENT DOCUMENTS

| | | | | |
|---|---|---|---|---|
| 6,970,422 | B1 * | 11/2005 | Ho et al. | 370/230 |
| 7,110,380 | B2 * | 9/2006 | Shvodian | 370/336 |
| 7,187,669 | B1 * | 3/2007 | Lee | 370/347 |
| 2005/0041670 | A1 * | 2/2005 | Lin et al. | 370/395.21 |
| 2007/0025289 | A1 * | 2/2007 | Nadagopalan | 370/329 |
| 2007/0263635 | A1 * | 11/2007 | Garg | 370/395.4 |

OTHER PUBLICATIONS

"International Standard, Information technology—Telecommunications and information exchange between systems—Local and metropolitan area networks—Specific requirements—Part II: Wireless LAN Medium Access Control (MAC) and Physical Layer (PHY) specifications, IEEE Std 802.11-1999, IEEE Aug. 1999".

An IEEE document entitled "Supplement to IEEE Standard for Information technology—Telecommunications and information exchange between systems—Local and metropolitan area Networks—Specific requirements—Part II: Wireless LAN Medium Access Control (MAC) and Physical Layer (PHY) specifications: Higher-Speed Physical Layer Extension in the 2.4 GHz Band, IEEE Std 802.11b-1999, IEEE Sep. 1999".

(Continued)

*Primary Examiner*—Ricky Ngo
*Assistant Examiner*—Kibrom T Hailu
(74) *Attorney, Agent, or Firm*—Greenblum & Bernstein, P.L.C.

(57) ABSTRACT

The present invention provides a method and system for efficiently scheduling wireless LAN traffic, giving the network the ability to serve both real-time and non-real time applications concurrently, while maintaining a requested level of quality of service for the real time application. It describes a method for scheduling quality of service traffic and a method to optimize this schedule thereby reducing the overall amount of time that is required for serving quality of service traffic (which is coordinated by a centralized network coordinator entity) and increasing the bandwidth available for non-real-time traffic. One application of such a scheduler would be WLANs that carry AV streams, such as may be found in a home based WLAN. Furthermore, a method is provided for announcing the schedule to all nodes in a wireless network to, for example, implement a power savings feature, thereby optimizing battery life and reducing the size and weight of portable network access terminals.

13 Claims, 9 Drawing Sheets

OTHER PUBLICATIONS

"Supplement to IEEE Standard for—Information technology—Telecommunications and information exchange between systems Local and Metropolitan Area Networks—Specific Requirements—Part II: Wireless LAN Medium Access Control (MAC) and Physical Layer (PHY) specifications: Higher-Speed Physical Layer Extension in the 5 GHz Band, IEEE Std. 802.11a-1999, IEEE Sep. 1999" published Dec. 30, 1999.

"Draft Supplement to Standard For—Telecommunications and information exchange between systems—LAN/MAN—Specific Requirements—Part II: Wireless Medium Access Control (MAC) and Physical Layer (PHY) specifications: medium access control (MAC) Enhancements for Quality of Service (QoS)," IEEE 802.11e/D4.0 Nov. 2002.

* cited by examiner

| Source Address | Time of Grant | Duration of Grant | Destination Address |
|---|---|---|---|
| Node 1 | 0 | 10 | Node 3 |
| Node 2 | 10 | 10 | Node 1 |
| Node 1 | 25 | 10 | Node 3 |
| Node 3 | 35 | 5 | Node 2 |
| : | : | : | : |
| : | : | : | : |
| Medium Coordinator | X | 0 | Broadcast |

Figure 8

METHOD AND SYSTEM FOR SCHEDULING TRAFFIC IN A WIRELESS NETWORK

FIELD OF THE INVENTION

The present invention provides a system for scheduling and admission control for traffic requiring quality of service (QoS), while optimizing the bandwidth available for non-QoS sensitive traffic, in wireless networks. When deployed at a coordinator station of a wireless network it provides a manner of centralized bandwidth management and tracking, and a manner of ascertaining whether new traffic streams can be admitted based on their bandwidth and service interval requirements. Having admitted the stream, the techniques described in the invention can be used to schedule traffic in the wireless network and frame, and to optimize the schedule so as to maximize bandwidth available for non-QoS traffic. The invention also describes a method for announcing the schedule to all associated nodes in the network which can be used by the individual stations to implement a power savings feature, thereby optimizing the lives of their batteries and leading to the design of smaller and lighter weight mobile wireless network terminals.

BACKGROUND AND MATERIAL INFORMATION

Wireless LANs have pervaded our everyday lives and are now almost ubiquitous in our work-places and our homes, providing greater connectivity and enhancing the quality of our ever information-dependent lifestyles. With new developments in communications technology, physical transmission speeds over wireless networks are now substantial enough to support AV transmission. However, due to the inherent nature of AV traffic streams, the network must be able to provide a certain level of QoS to meet end-user satisfaction. This invention pertains to a system that can handle and schedule both time sensitive traffic (such as AV) and non-time sensitive (such as traditional file transfer applications) traffic over the same wireless network.

"Local and Metropolitan Area Networks-Specific Requirements-Part 11: Wireless LAN Medium Access Control (MAC) and Physical Layer (PHY) specifications", IEEE Std 802.11-1999, IEEE, August 1999 discusses a cost-effective solution for networking computers and other devices, wirelessly. With enhancements to signal processing and modulation technology, the enhancements to the standard were made so as to support higher data rates using new physical layers, see e.g., "Local and Metropolitan Area Networks-Specific Requirements-Part 11: Wireless LAN Medium Access Control (MAC) and Physical Layer (PHY) specifications: Higher-Speed Physical Layer Extension in the 2.4 GHz Band", IEEE Std 802.11b-1999, IEEE, September 1999 and "Local and Metropolitan Area Networks-Specific Requirements-Part 11: Wireless LAN Medium Access Control (MAC) and Physical Layer (PHY) specifications: Higher-Speed Physical Layer Extension in the 5 GHz Band", IEEE Std 802.11a-1999, IEEE, September 1999.

The latest version of the standard that is being developed is in the form of enhancements to the MAC layer for supporting QoS—an essential requirement for AV devices, see e.g., "Draft Supplement to LAN/MAN Specific Requirements—Part 11: Wireless Medium Access Control (MAC) and Physical Layer (PHY) specifications: MAC Enhancements for Quality of Service (QoS)", IEEE Std 802.11e/D4.0, November 2002. While the standard defines protocols and mechanisms for supporting AV traffic, it does not describe a system for achieving the same.

While IEEE 802.11e specifies MAC level protocols and mechanisms for improving the throughput and providing for QoS in a wireless network, it does not provide for a system that can achieve the same. With wireless LANs gaining increasing popularity and ubiquity, newer applications such as AV and multi-media transmissions over them are being developed. This invention addresses the problem of scheduling and admission control in the wireless network, a role that is delegated to a centralized medium coordinator in the network. The standard specifies an attribute that constrains the maximum amount of bandwidth that may be used for QoS traffic during each super-frame of the wireless network. This invention addresses the problem of determining traffic stream admission depending on resource availability and stated requirements. It also solves the problem of generating an optimized schedule so as to most effectively fully utilize the wireless bandwidth.

With improvements in device technology, electronic equipment is steadily shrinking in size, while rapidly expanding in functionality. While handheld wireless computational devices have already made their debut, there is an ever-increasing need to minimize power consumption, thereby improving battery life and providing for smaller and lighter weight terminals. This invention also describes a mechanism for the centralized coordinating node of the wireless network to introduce power-saving features on the stations, thereby improving their performance.

SUMMARY OF THE INVENTION

This invention solves the problems of admission control and scheduling in a wireless network by providing the centralized medium coordinator with a systematic method to translate the requirements of a traffic stream to resource-requirements in the wireless network. It provides for a method of scheduling traffic from stations requiring QoS, by splitting up the time reserved for QoS traffic on the wireless medium into smaller intervals of time and scheduling opportunities for different nodes to transmit their streams during these intervals. The scheduling is performed in a manner so as to simultaneously optimize the number of individual accesses to the medium and to minimize the variance between the unused time in each interval. The invention provides for a method to optimize the schedule, depending on streams stated requirements. It also provides a method for announcing the schedule to all nodes in the network and a mechanism by which individual nodes can use this information to conserve power and perform synchronization.

The present invention can be used to perform admission control and scheduling at the hybrid coordinator (HC) of a wireless local area network, of the variety discussed in IEEE802.11 e. Nodes associated with the network, desiring to transmit a traffic stream first make their requirements known to the HC of the network. The HC translates these requirements into bandwidth requirements to determine whether it can meet the needs of the stream and hence admit it, or whether it needs to suggest an alternate set of parameters for the stream with which it can be supported, or whether the stream cannot be supported altogether. In the next stage of the process, scheduling is performed by the HC and this schedule is optimized so as to minimize the amount of time needed for the operation of the contention free period, thereby increasing medium availability for non-contention based traffic.

The invention also describes a new technique for announcing the schedule, thereby reducing the overheads introduced by polling. The schedule announcement technique can further be used by individual nodes to implement a power-savings mode—a vital feature for handheld battery operated devices.

Accordingly, an aspect of the present invention is to provide a system for the transmission of two different types of traffic in a wireless network, including time bounded repetitive traffic, and randomly generated traffic. The system includes repeating frame durations including a period for the transmission of time bounded repetitive traffic and a period for the transmission of randomly generated traffic, a centralized coordinating node responsible for bandwidth management, resource scheduling and time coordination among nodes of the wireless network; and at least one wireless node capable of transmitting and receiving information between other nodes.

Another aspect of the present invention is to provide a system for the transmission of traffic requiring a certain level of quality of service. The system includes a centralized network coordinator responsible for bandwidth management, resource scheduling and time coordination among nodes of the wireless network, capable of interpreting a stream requirement furnished to it by a transmitting node, performing stream admission control and stream scheduling based on the stream requirements, and multiple nodes capable of specifying respective traffic stream requirements to the centralized coordinator.

Another aspect of the present invention is to provide a system for scheduling traffic requiring a stated level of quality of service in a wireless network having repeating frame durations including a period for transmission of bounded repetitive traffic and a period for transmission of randomly generated traffic. The system includes a centralized coordinating node that receives stream specification requirements from a node wishing to initiate a traffic stream, that performs stream admission control based on bandwidth requested by the node and resources available in the network, that generates a traffic schedule based on a maximum duration available for the traffic requiring the quality of service, that verifies conformance of the schedule based on the requirements of a maximum tolerable interval between medium grants for all streams, that computes a reduction of a required duration for coordinated transmission of traffic in the wireless network frame and optimizes the schedule, and that broadcasts schedule information to all nodes of the network at a start of every wireless network frame.

Another aspect of the present invention is to provide a method for a centralized coordinating node to schedule traffic in a wireless network requiring a stated level of quality of service. The method includes receiving stream specification requirements from a node wishing to initiate a traffic stream, performing stream admission control based on bandwidth requested by the node and resources available in the network, generating a traffic schedule based on a maximum duration available for the traffic requiring the quality of service, in the wireless network having repeating frame durations comprising a period for the transmission of time bounded repetitive traffic and a period for randomly generated traffic, verifying conformance of the schedule based on the requirements of a maximum tolerable interval between medium grants, for all streams, computing a reduction of required duration for coordinated transmission of traffic in the wireless network frame and optimizing the schedule, and broadcasting the schedule information to all stations at a start of every wireless network frame. The reception of the stream specification requirements may include receiving information regarding a destination address of the stream and information regarding parameters describing characteristics of the stream.

The method of performing stream admission control may further include computing a time required during each network frame for serving the stream based on information specific to the wireless network, including frame length and overheads associated with transmission, and the parameters describing the characteristics of the stream. In this regard, the method may include comparing required resources associated with the stream with the available network resources to determine whether the stream can be admitted. The computing may include computing an integer number of medium grants of maximum duration required during each network frame, to serve the stream, and computing an actual transmission time using the integer number, accounting for a transmission rate, physical layer overheads, and a retransmission compensation factor.

The generating of the traffic schedule for medium grants within the maximum duration in the network frame for the traffic requiring the quality of service may further include computing a minimum number of medium grants required to serve a stream, based on a maximum duration of a medium grant for the wireless network, rounding up the minimum number of medium grants required for each stream in a manner to minimize an increase in the minimum number of medium grants required for each stream, in which the rounding yields a set of numbers that are factors of the largest minimum number of medium grants required to serve all streams, dividing a portion of the frame available for coordinated transmissions into uniform grant intervals, based on a largest value of the number of medium grants required determined during the rounding, and allocating medium grants of different streams to the grant intervals, while minimizing the variance in unutilized time of each of the grant intervals. The dividing may further include computing a global parameter of the grant intervals, defined as the period between recurrence of successive medium grants for the stream having a largest number of medium grants in a network frame, in which parameters are used that include a maximum duration in the network frame available for coordinated transmissions, and the maximum value of the medium grants required per network frame for all streams. The allocating may further include creating a data structure to track available duration, in units of time, within each grant interval, allocating medium grants to different grant intervals in a periodic manner, while minimizing the variance between the un-utilized time in each grant interval, using the data structure to track the resources available in each grant interval, and if medium grants cannot be allocated for a particular stream, then the value of medium grants required per grant interval for the particular stream is rounded up to a next highest factor of the maximum value of the minimum number of medium grants required to serve all streams, and again attempting to allocate the medium grants to different grant intervals. The data structure may include a vector including a number of elements corresponding to the number of grant intervals that the coordinated transmission period of each network frame is divided into, in which each element is initialized to the duration of the computed grant interval.

The allocation of medium grants may further include computing a stream specific parameter of the grant allocation interval, in which the stream specific parameter of the grant allocation interval is the periodicity in terms of grant intervals with which medium grants need to be allocated for a particular stream, and in which the input parameters are the set of medium grants required per network frame, for all admitted streams.

The verifying may include computing a difference between a maximum medium grant interval, and a duration between the last medium grant in a wireless network frame to the first medium grant of the same stream in a next frame, as determined by the scheduling of medium grants, and determining if any of the values in the difference between the maximum medium grant interval and the duration between the last medium grant are negative, indicating that stream requirements on maximum medium grant interval of the stream is being violated, wherein the requesting stream cannot be admitted.

Further, the computing may include computing an upper-bound on a possible reduction of the coordinated transmission period using a computed difference between a maximum medium grant interval, and a duration between a last medium grant in a wireless network frame to a first medium grant of the same stream in the next frame, as determined by the scheduling of medium grants computing an upper-bound on a maximum reduction in time per grant interval, determining the actual reduction per grant interval as the minimum of all the elements in a data structure to track available duration within each grant interval after scheduling has been performed, and the upper-bound on the maximum reduction in time per grant interval is determined, and reducing the grant intervals by the actual reduction per grant interval and rescheduling the medium grants allocated the streams.

Still further, the method may include announcing the optimized schedule arrived at by the medium coordinator, the optimized schedule including a source address of the streams, a relative time of medium grants, a duration of medium grants, and a destination address of the stream. The nodes in the wireless network may perform timing synchronization by adjusting their local clocks on receipt of broad-cast frames transmitted by the medium coordinator, including the frames containing the optimized schedule. The optimized schedule may be used in a power savings mode, which includes transmitting the optimized schedule from the medium coordinator as part of a Signal-startCTP packet, signaling the start of a new wireless network frame, determining at each node, based on the received schedule, when the node must wake-up to transmit and when the node is due to receive a transmission during the coordinated transmission period, such that during a remainder of the coordinated transmission period, the node may operate in the power savings mode, and in which a last entry of the schedule can be used by the medium coordinator to inform all nodes to power-on their receivers until a next schedule is received.

The nodes may also dynamically request additional bandwidth from the medium coordinator, which includes sending a supplementary bandwidth request frame to the medium coordinator during a granted medium grant, in which the medium coordinator may grant a supplementary medium grant to the requesting station depending on an extent of reduction in the coordinated transmission period obtained by the optimization of the schedule.

BRIEF DESCRIPTION OF THE DRAWINGS

The above, and other objects, features and advantages of the present invention will be made apparent from the following description of the preferred embodiments, given as non-limiting examples, with reference to the accompanying drawings, in which.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An apparatus and methods to schedule the transmission of traffic while providing a certain level of QoS, in a WLAN network is disclosed in this section. To help understand the invention, the following definitions are used:

A "WLAN" refers to a wireless local area network. It contains an arbitrary number of devices in order to provide LAN services to mobile terminals through wireless access technologies.

A "node" refers to a device that is capable of accessing the service provided by the WLAN.

"Medium" refers to the wireless channel on which the WLAN is operating.

A "Medium Coordinator (MC)" refers to a centralized node that controls the operation of the WLAN.

A "super-frame" refers to the network frame timing structure that is enforced by the medium coordinator on all other nodes.

"Controlled Transmission Period (CTP)" refers to the part of the super-frame during which transmissions from various nodes are controlled and coordinated by the medium coordinator.

"Random Transmission Period (RTP)" refers to the part of the super-frame during which nodes may independently contend for the medium and transmit data to one another.

"Maximum CTP Duration" refers to the limit on the amount of time of the super-frame that may be used for the CTP.

"Signal-startCTP frame" refers to a frame that is transmitted by the medium coordinator periodically to mark the commencement of a new super-frame and CTP. It contains crucial information that is common to all nodes and is necessary for successful operation of the WLAN "Signal-stopCTP frame" refers to a frame that is transmitted by the medium coordinator to mark the termination of the CTP and the commencement of the RTP.

A "stream" is a gathering of packets transferred in the network that have certain attributes in common.

A "medium grant (MG)" refers to a time duration that is allocated by the MC to a particular node or stream during the super-frame.

A "schedule-element" refers to an information element of a frame that contains the schedule for allocation of medium grants to different nodes or streams.

A "stream specification requirement (SSR)" is a list of attributes that specify the requirements of service that the stream expects from the WLAN.

A "Maximum Medium Grant Interval" is a parameter of the stream specification requirement specifying the maximum tolerable interval that the stream can tolerate between consecutive medium grants.

"Delay Bound" is the maximum delay that is tolerable by a packet belonging to this stream, after which the information is no longer valid.

A "scheduling interval" is the period of time for which the schedule is computed.

A "Grant Interval" is the interval between two medium grants belonging to the stream with the maximum number of medium grants required per SFD.

"Grant Allocation Vector" (GAV) is a data structure used to track the allocation of the channel during the CTP duration. It consists of a number of elements corresponding to the number of Grant Intervals, each initialized with the duration of the medium grant duration, in appropriate time units.

"Medium Credit" is the amount of unutilized time available in each Grant Interval. Its value is stored in the elements of the grant allocation vector and is used to track the utilization of the channel during the CTP duration.

"Inter-SFD MG to MG Delay" is defined as the time duration between the last MG of the previous super-frame to the first MG of the same stream in the next super-frame.

In the following description, for purposes of explanation, specific numbers, times, structures, protocol names and other parameters are set forth in order to provide a thorough understanding of the present invention. However, it will be apparent to anyone skilled in the art that the present invention may be implemented without these specific details. In other instances, well-known components and modules are shown in block diagram in order not to obscure the present invention unnecessarily.

For a thorough understanding of the invention, here below, some operation sequences, information data structures and techniques for calculation are given. Certain data structures are used and they only serve as an example of the implementation of the present invention. It is obvious to the person skilled in the art that in real implementation, new information could be added, and certain parts could be omitted depending on the actual situation they are used in.

Figure 1:
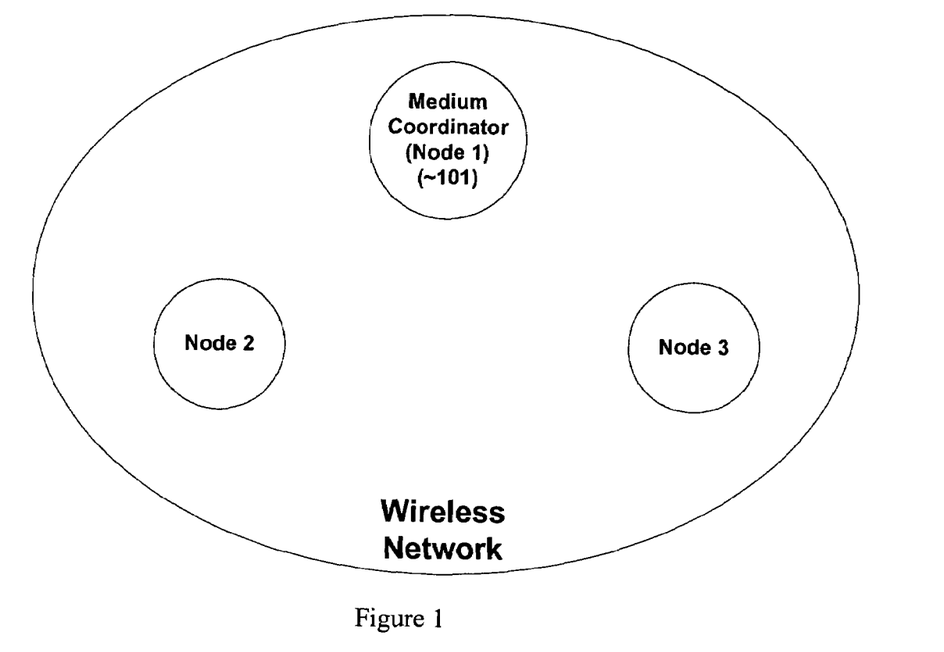
FIG. 1 is an exemplary wireless communications network that includes a plurality of nodes including a medium coordinator.

FIG. 1 shows a typical WLAN network, consisting of several nodes. The network may be used for the transmission of different types of data, with different transmission requirements, between nodes. For example, nodes running a file transfer application may not require assured transmission speeds, rather they may need guaranteed data delivery. On the other hand, nodes transmitting an AV stream for example would need an assured bandwidth at constant time intervals. Hence, in this case the emphasis is on resource allocation in the network. As the network needs to cater to the needs of nodes with different traffic requirements, the super-frame is divided into two segments, one for supporting transfers requiring QoS and another for non-QoS traffic. In order to control resources on the network and super-frame timing, one of the nodes in the WLAN, called the medium coordinator 101 takes on additional responsibilities of controlling access to the medium and coordinating timing between all other nodes.

Figure 2:
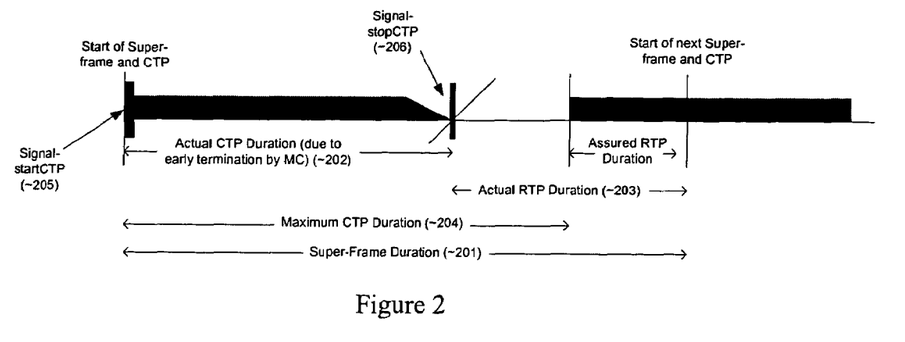
FIG. 2 is an exemplary wireless LAN super-frame including a duration for transmission of time bounded traffic and non-time bounded traffic, according to an aspect of the present invention.

FIG. 2 shows the structure of the WLAN super-frame 201. As shown, the WLAN super-frame 201 is divided into two sections, i.e., 1) the Controlled Transmission Period 202 during which access to the channel is controlled by the MC 101, and hence QoS transmissions can achieved and 2) the Random Transmission Period 203. The CTP 202 is used for transmitting time-sensitive delay-bounded traffic, which is of a recurring nature, such as audio or video streams. The extent of the CTP duration is limited by the Maximum CTP duration 204, following which the medium coordinator ceases to control access to the medium. This is done so as to allow for some RTP duration within the super-frame for stations to signal control information, such as requests for association, requests for bandwidth during the CTP etc. Access to the channel during the RTP 203 maybe on the basis of contention, using a distributed access protocol that is executed at each of the nodes. The start of the CTP and the new super-frame is marked by the transmission of a Signal-startCTP frame 205 by the MC 101. The transmission of the Signal-startCTP frame 205 occurs at a periodic interval that is defined by the medium coordinator and is made known to all nodes in the WLAN. The Signal-stopCTP 206 frame indicates the end of the CTP 202 and the start of the RTP 203. A node contending for access to the medium during the RTP 203 will ensure that its transmission does not extend into the next super-frame, as is defined by the recurrence of the Signal-startCTP frames 205.

As traffic scheduled during the CTP 202 is of a recurring nature, such as an audio/video stream etc., the MC 101 must make every effort to ensure successful and timely delivery to the destination station. The Medium Coordinator 101 node grants access to different wireless nodes that are part of the same network by announcing the scheduled medium grants by means of the schedule element that is part of the Signal-startCTP frame 205 that marks the commencement of every super-frame.

Figure 3:
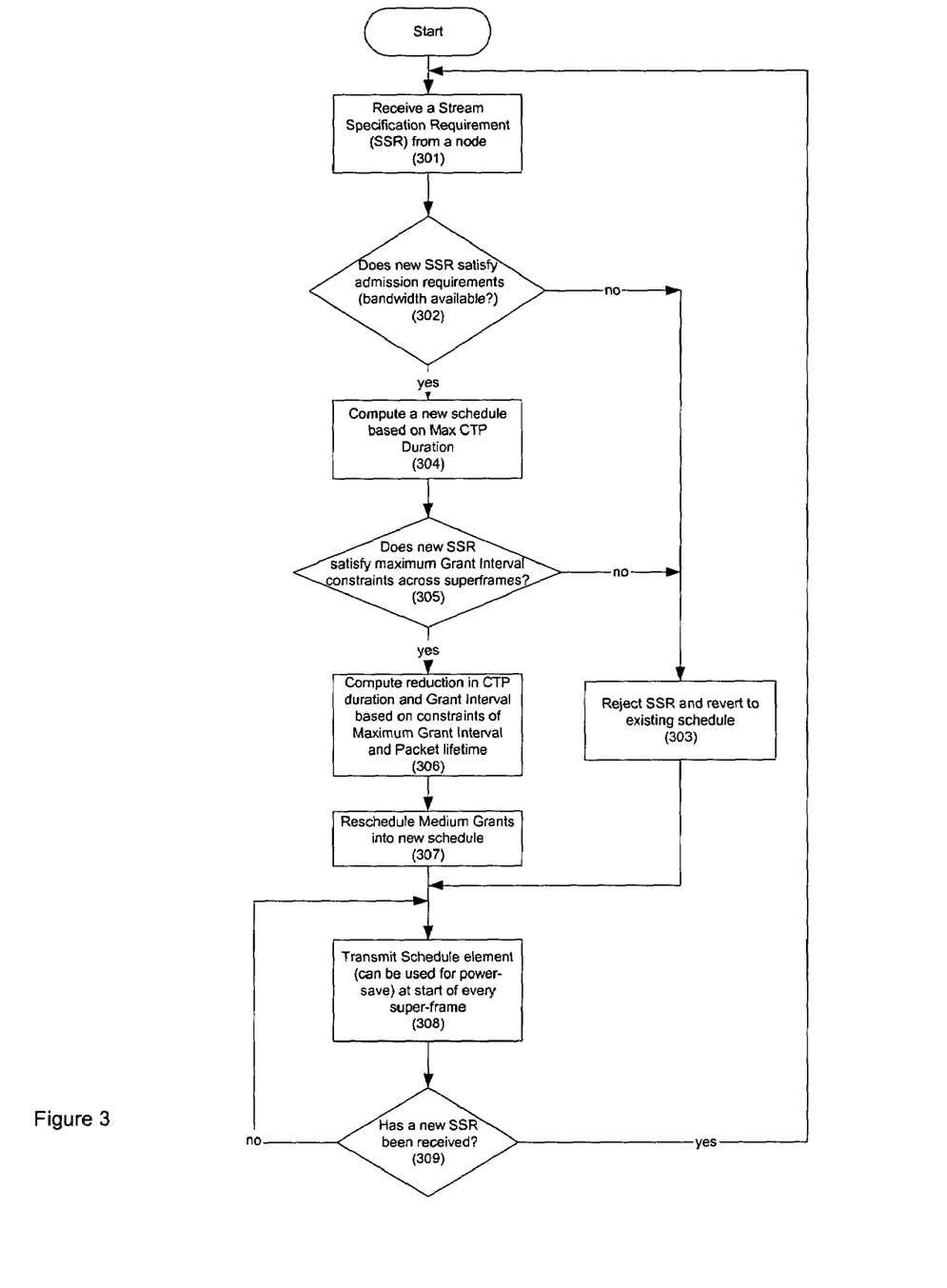
FIG. 3 is an exemplary flow diagram illustrating the procedures followed by the medium coordinator in scheduling medium grants during a CTP duration and illustrating checks for admission control when the medium coordinator receives a new SSR, according to an aspect of the present invention.

An overview of the scheduling process performed by the MC 101 is shown in FIG. 3. A node wishing to transmit a stream first specifies a stream specification requirement (which maybe in the form of a frame transmitted during the RTP 203) to the medium coordinator 101. On receiving a stream specification requirement (SSR) at step 301, the MC 101 makes a preliminary check at step 302 to verify whether enough resources are available in the CTP 202 to service the requested stream requirements. If the requested bandwidth exceeds what is available in the CTP 202, then the MC 101 rejects the SSR and reverts to the existing schedule at step 303. If the MC 101 determines that sufficient bandwidth exists in the CTP 202, a new schedule is computed based on the actual CTP duration being set to the maximum CTP duration 204 at step 304. A check at step 305 is performed to determine whether the delays between allocated grant intervals across super-frames for all streams, satisfy the Maximum Medium Grant Interval for each respective stream. If the constraint above is violated on account of the introduction of the new stream, the SSR is rejected and the MC 101 reverts to the existing schedule at step 303. Otherwise, the reduction in CTP duration is computed at step 306, and a new schedule is generated at step 307. The schedule is then broadcast to all nodes in the wireless network at step 308 through a schedule element, which is part of the Signal-startCTP frame 205. At step 309, a determination is made as to whether a new SSR has been received. If a new SSR has been received, then processing continues at step 301. Otherwise, if a new SSR has not been received, then processing continues at step 308.

Figure 4:
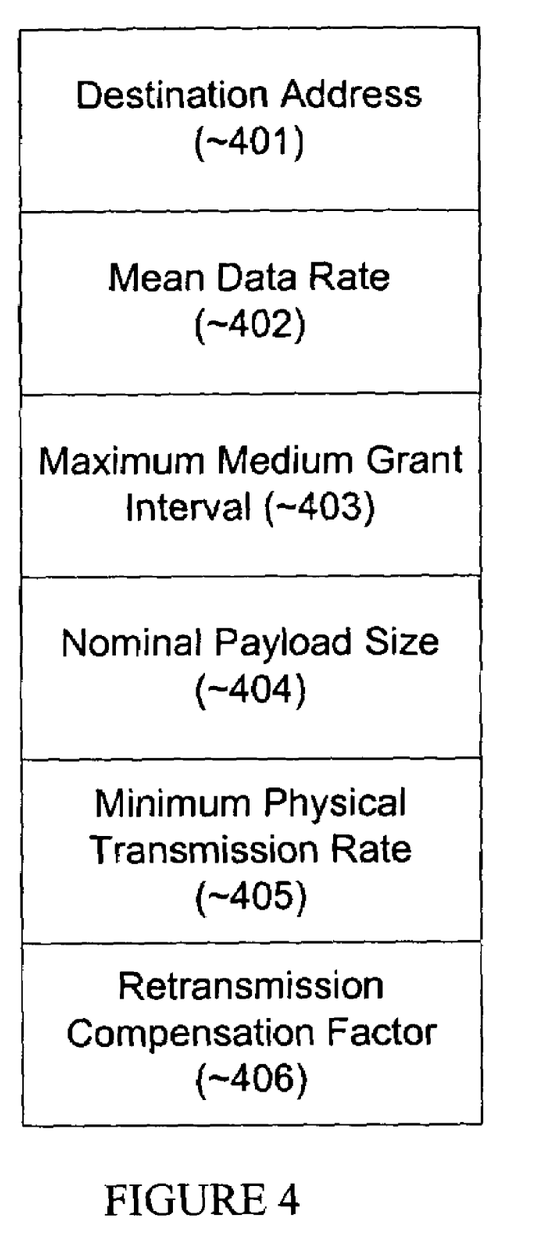
FIG. 4 illustrates exemplary elements that are part of the SSR message frame sent to the medium coordinator by a node wishing to initiate the transmission of a stream, according to an aspect of the present invention.

FIG. 4 shows the parameters specified by the stream specification requirements. The Destination Address field 401 specifies the intended recipient of the stream specified by the SSR. The Mean Data Rate 402 specifies the average data rate for transmission of packets belonging to this stream within the bounds of the SSR. The Maximum Medium Grant Interval 403 specifies the maximum tolerable interval between the beginnings of two successive medium grants being issued to the stream served by this SSR. Note that specifying the Maximum Medium Grant Interval accounts for the delay bound of the stream. The Nominal Payload Size 404 specifies the average size of data packets of the stream specified by the SSR that are delivered to the MAC and the Minimum Physical Transmission Rate 405 specifies the minimum data transmission rate that can be supported between the originator and the destination nodes of the stream. The node may also optionally specify a retransmission compensation factor 406 to account for retransmissions due to transmissions received in error etc.

Upon receiving the SSR, the medium coordinator 101 first computes the total amount of time required to serve the stream during the current scheduling interval. The Number of Packets Required to serve the stream is computed as the integer value that is greater than or equal to the product of the Mean Data Rate and the Super-frame Duration divided by the Nominal Payload Size, as shown in equation (1).

(Equation 1) Computation of the number of packets required to serve a stream with $SSR_i$ during a super-frame duration.

$$NumberOfPacketsReqd_i = \left\lceil \frac{MeanDataRate_i \times SuperFrameDuration}{NominalPayloadSize_i} \right\rceil$$

Once the Number of Packets Required has been calculated, a computation is made to determine the Actual Channel Time Required as the product of the Number of Packets Required and the Nominal Payload Size, divided by the Minimum Physical Transmission Rate, which is then summed with the overheads introduced by the physical layer of the transmission system, as shown in equation (2).

(Equation 2) Calculation of the actual time required on the channel for transmitting stream with $SSR_i$, during each super-frame duration.

$$ActChannelTimeReq_i = \\ NoOfPacketsReqd_i \times \frac{NominalPayloadSize_i}{MinimumPHYRate_i} + PHYOverheads$$

This may be optionally adjusted by a Retransmission Compensation Factor, which is optionally specified by the SSR, to obtain the Channel Time Required, as shown in equation (3).

(Equation 3) Computation of the channel time used based on adjusting the actual channel time required by a retransmission compensation factor, to compensate for retransmissions due to bad channel conditions etc.

$$ChannelTime\ Reqd_i = ActChannelTime\ Reqd_i \times RetransmissionCompensationFactor_i$$

Although not explicitly stated, it is assumed that in all calculations the medium coordinator 101 accounts for the finite duration during the super-frame, required for the transmission of the Signal-startCTP 205 and Signal-stopCTP frames 206.

In order to admit the stream, the MC 101 must ensure that enough wireless bandwidth exists in order to serve it. Hence, the summation of the Transmission Time Required for all streams must be less than the Maximum CTP Duration. If this condition is not satisfied, then the medium coordinator 101 should either: a) suggest an alternate SSR, with Mean Data Rate 402 equivalent to the available wireless bandwidth, or b) deny the stream and revert back to the existing schedule.

From the Channel Time Required computed above, the MC 101 must determine the minimum number of Medium Grants required per super-frame duration to serve the stream. The Medium Grants Required per SFD is the integer that is greater than or equal to the result obtained by the quotient of the Channel Time Required and the Maximum allowable Medium Grant duration (a constant for the WLAN network), as shown in equation (4).

(Equation 4) The number of medium grants required per super-frame duration (SFD) is based on the maximum medium grant duration, which is a constant for the wireless network.

$$MediumGrantsReqdperSFD_i = \left\lceil \frac{ChannelTimeReqd_i}{MaxMediumGrantDuration} \right\rceil$$

Among the values of the Medium Grants Required per SFD for all the streams, the largest value is selected and is rounded up to the first non-prime integer. For all other streams, if the value of Medium Grants Required per SFD is not already a factor of the value selected above, we round them up so that they are factors. Thus, these values form the new set of Medium Grants Required per SFD and will be used subsequently to calculate the schedule.

Figure 6:
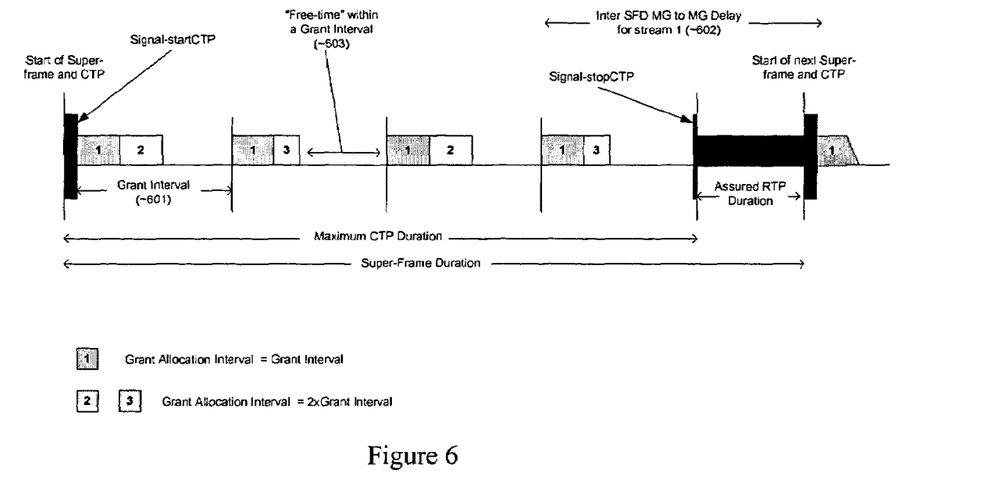
FIG. 6 illustrates an exemplary placement of medium grants within grant intervals, using the procedure discussed with respect to FIGS. 5A and 5B with the scheduling interval set to the maximum CTP duration, according to an aspect of the present invention.

The overall grant interval 601 (i.e., the periodicity of medium grants of the stream with the maximum Medium Grants Required per SFD), as shown in FIG. 6, during the CTP is determined by the result obtained from the quotient of the Maximum CTP Duration and the maximum value of the Medium Grants Requiredper SFD for all the streams. The computation of the overall grant interval is illustrated by equation (5).

(Equation 5) The overall grant interval is the periodicity of the medium grants of the stream with the highest number of medium grants required per SFD, i.e., the following equation:

$$GrantInterval = \frac{MaxCTPDuration}{\max(MediumGrantsReqdperSFD_i)}$$

Figure 5A:
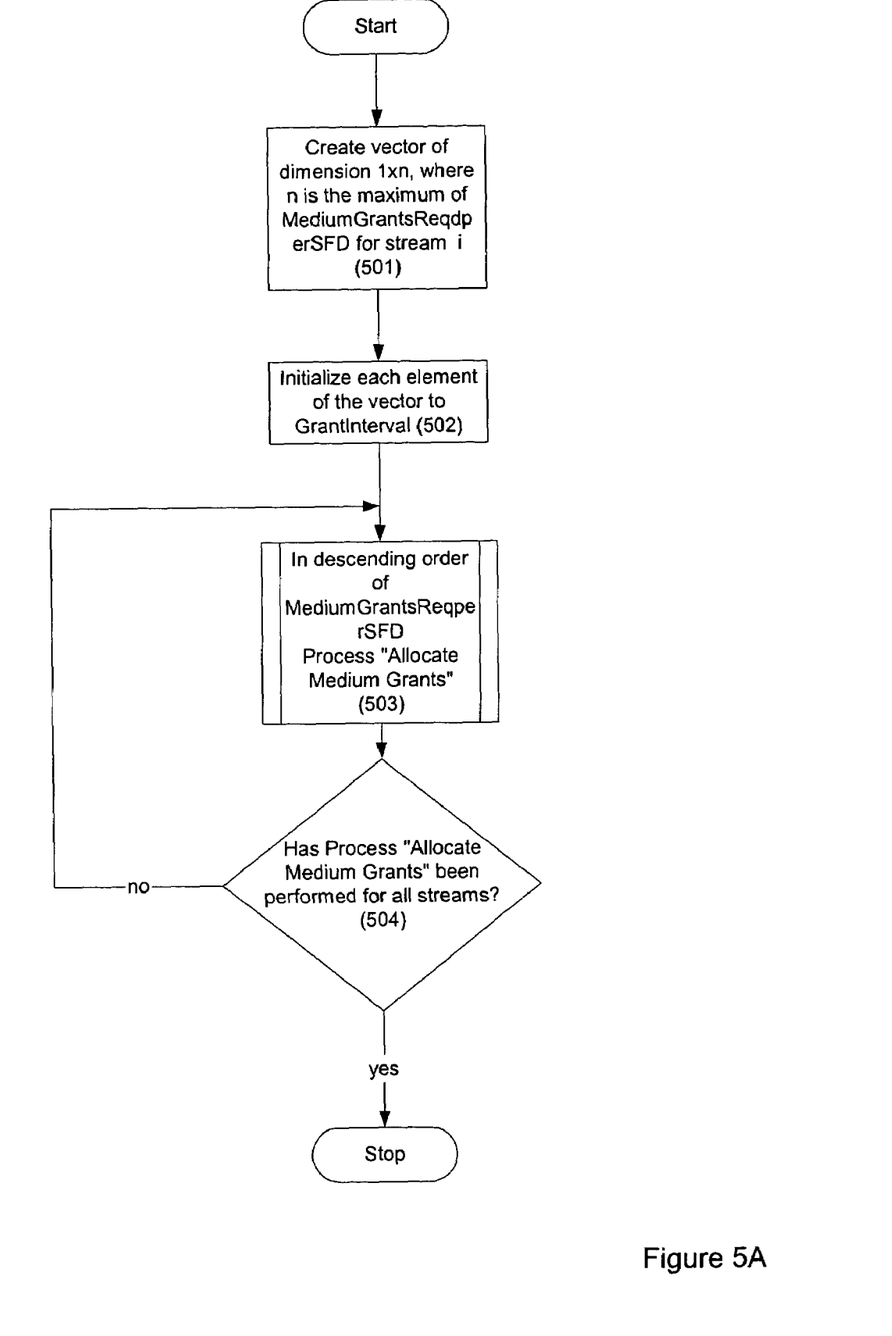
FIG. 5A is an exemplary flow diagram illustrating a procedure followed by the medium coordinator while assigning medium grants to grant intervals, while minimizing the variance of the un-utilized time in each grant interval, according to an aspect of the present invention.
Figure 5B:
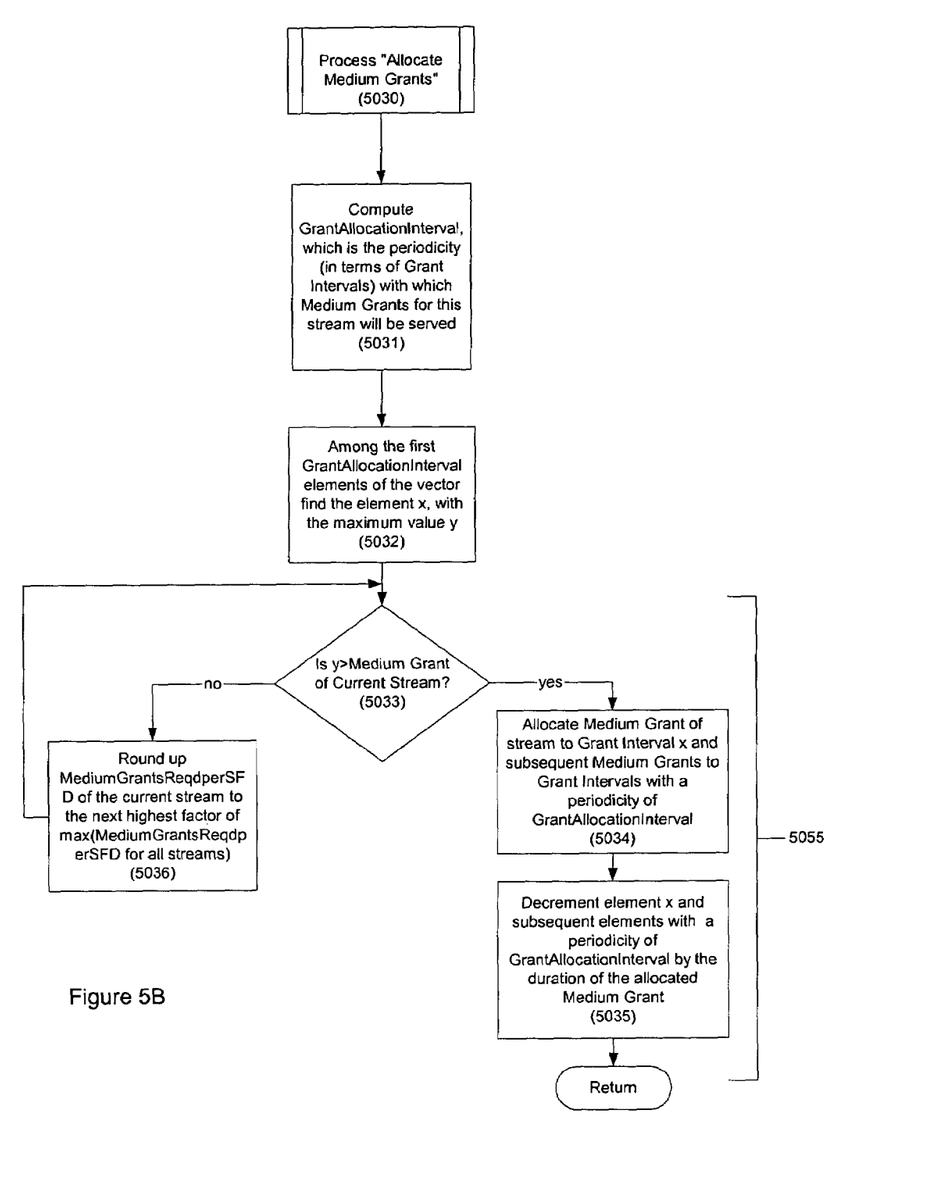
FIG. 5B is an exemplary flow diagram illustrating a sub-routine process of the exemplary flow diagram of FIG. 5A, according to an aspect of the present invention.

Having chosen the Grant Interval, the scheduler must now arrange the medium grants for each stream so as to minimize the variance between the utilized-time during each grant interval. This is done so as to maximize the minimum of all the silent-durations (i.e. the time during the grant interval during which no transmission is scheduled by the MC). The mechanism for doing this is depicted in the flowchart of FIGS. 5A and 5B. First, a vector (called the Grant Allocation Vector (GAV)) is created with the number of elements equal to the maximum of the Medium Grants Required per SFD, for all streams at step 501. The value of each element of this vector is initialized at step 502 with the duration available for allocation of medium grants during each grant interval. Initially, since no allocation has been performed, each element of the vector has the value of Grant Interval time-units, as obtained from equation (5) above.

At step 503, processing goes to a subroutine (5030) in descending order of the number of Medium Grants Reqd per SFD for different streams to compute the Grant Allocation Interval, as the result obtained by dividing the maximum value of the Medium Grants Required per SFD for all streams by the Medium Grants Required per SFD for the stream in step 503. Referring to FIG. 5B, subroutine (5030) is performed to Allocate Medium Grants for each stream. At (5031), the GrantAllocationInterval is calculated from equation (6), which indicates the periodicity (in terms of Grant Intervals) with which medium grants pertaining to the stream in question will be scheduled.

(Equation 6) The grant allocation interval for a particular stream is computed in terms of the periodicity in terms of Grant Intervals with which medium grants need to be allocated to that stream.

$$GrantAllocationInterval_i = \frac{\max(MediumGrantsReqdperSFD_i)}{MediumGrantsReqdperSFD_i}$$

At step 5032, a search is performed among the first Grant Allocation Interval elements of the GAV for the element x with the maximum value y (in terms of unallocated time-units during that grant interval). At step 5033, if the maximum value y is greater than the medium grant of the current stream then a medium grant is allocated to the corresponding grant interval by the process collectively referred to as step 5055. Subsequent Medium Grants are allocated to grant intervals at a period of Grant Allocation Interval from the initially allocated medium grant at step 5034. Upon allocation of a medium grant to a grant interval, the corresponding number of medium credits is decremented from the respective grant interval element of the GAV, described above at step 5035. If the maximum value y at step 5033 is not greater than the medium grant of the current stream, then it is not possible to allocate a medium grant to any of the grant intervals for a particular stream. As a result, processing continues at step 5036 where the Medium Grants Required per SFD for that particular stream is rounded up to the next highest factor of the maximum value of Medium Grants Required per SFD for all streams and an attempt is made to re-allocate medium grants for that stream again at step 5033. Then, referring again to FIG. 5A, at step 504 a determination is made as to whether the process "Allocate Medium Grants" has been performed for all the streams. If the process has been performed for all of the streams, then processing ends. Otherwise, processing continues with step 503 and accordingly, the subroutine at step 5030.

FIG. 6 shows the allocation of medium grants for different streams and their placement within the grant intervals. The above process has resulted in a tentative schedule that utilizes the Maximum CTP Duration. A conformance test is now performed to validate the schedule with respect to the Maximum Medium Grant Interval parameter 603 for each stream, across super-frames. For each stream, the Inter-SFD MG to MG Delay, is computed. Numeral 602 depicts an example for Inter-SFD MG to MG Delay for stream 1. From the values computed above, for all streams, the parameter x is computed, defined as the difference between the Maximum Medium Grant Interval and the Inter-SFD MG to MG Delay, as shown in equation (7).

(Equation 7) The parameter denoting the difference between the Maximum Medium Grant Interval and the Inter-SFD MG to MG Delay is computed for every stream as:

$$x_i = MaximumMediumGrantInterval_i - InterSFD\_MGtoMGDelay_i$$

If, for any of the streams, the parameter, x is found to be negative, then the schedule is non-conformant as it violates the SSR of at least one of the streams. In such an eventuality, the MC 101 must reject the SSR of the stream requesting to be admitted and revert back to the existing schedule for the remaining streams.

The schedule obtained above is based on using the Maximum CTP Duration for scheduling time-bounded traffic. This reduces the time available for RTP transmissions to a minimum. If the conformance test stated in equation (7) above is passed, the schedule may be optimized so as to minimize the time required during the CTP to serve all the streams. This will allow the MC 101 to start the RTP earlier, thereby increasing the opportunities for transmission by nodes during the RTP. The maximum allowable reduction in the CTP duration is given by the minimum of the parameter x for all streams and is computed in equation (8).

(Equation 8) The maximum reduction in the CTP so as not to violate the Maximum Medium Grant Interval, as specified in the SSR, is determined to be the minimum of the parameter computed in equation (7), for all admitted streams.

$$MaxCTP\ Reduction = \min(x_i)$$

The reduction in the CTP must be redistributed uniformly among the various Grant Intervals. The Maximum Reduction per Grant Interval is obtained by dividing the Maximum CTP Reduction by the maximum value of the Medium Grants Required per SFD for all streams, as shown in equation (9).

(Equation 9) The maximum reduction per grant interval is computed by uniformly distributing the Maximum CTP Reduction, among all the grant intervals.

$$MaximumReductionperGrantInterval = \frac{MaxCTP\ Reduction}{\max(MediumGrantsReqdperSFD_i)}$$

The actual reduction per Grant Interval can be smaller than the Maximum Reduction per Grant Interval, due to the fact that there might not be sufficient "free-time" 603, referring again to FIG. 6, within a particular Grant Interval due to the allocation of medium grants by the scheduling process. Hence the actual reduction is finally chosen to be the minimum value among the Maximum Reduction per Grant Interval and the medium credits available in the Grant Allocation Vector and is depicted in equation (10).

(Equation 10) The actual reduction per grant interval could be less than the Maximum Reduction per Grant Interval, computed in equation (9) due to the variation in the number of medium credits allocated to different grant intervals during the scheduling process.

$$\text{Actual ReductionperGrantInterval} = \min(\text{Maximimum ReductionperGrantInterval}, \min(\text{GrantAllocation Vector}_i))$$

Figure 7:
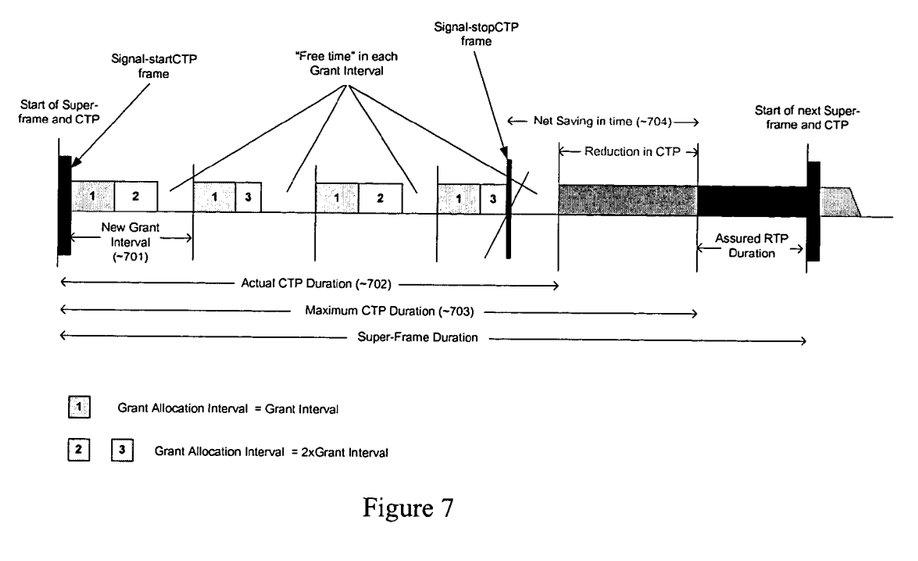
FIG. 7 illustrates an exemplary final schedule, which is obtained by reducing the grant intervals and optimizing the use of the CT? duration thereby saving bandwidth, according to an aspect of the present invention.

Referring now to FIG. 7, the new Grant Interval 701 is computed by reducing the old Grant Interval 601 by the Actual Reduction per Grant Interval, obtained from the calculation above. The relative positions of the medium grants within the grant intervals, after rescheduling, shown in FIG. 7, remains the same as they were in FIG. 6. The process of rescheduling for optimization of bandwidth-use results in the actual CTP duration 702 being smaller than the Maximum CTP duration 703, and consequently a net saving in bandwidth equivalent to 704.

Figure 8:
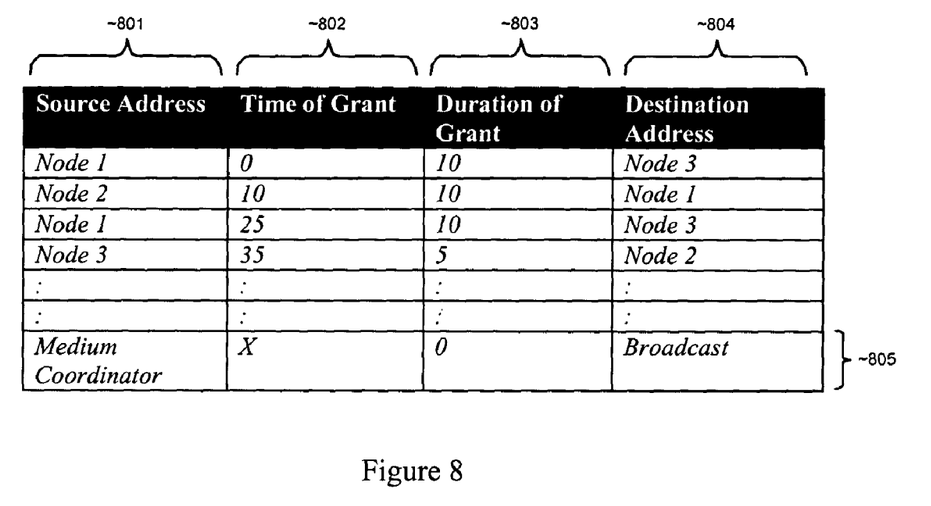
FIG. 8 shows exemplary information contained in a schedule element that forms a part of the signal-start CTP frame, according to an aspect of the present invention.

As a WLAN is a distributed system, the MC 101 must inform all nodes of the schedule, once it has been computed. In order to minimize the overheads introduced by individually informing each node/stream of a medium grant at the scheduled time, the MC 101 announces the schedule at the start of the CTP via the scheduling element of the Signal-startCTP frame 205. Upon receiving the Signal-startCTP frame 205, each node will synchronize its clock and interpret the schedule information, which is shown in FIG. 8. The schedule element contains information about the origin of a stream 801, the relative time at which the transmission is scheduled to take place 802, the duration of the medium grant 803, and the destination node address 804. From the above information, a node which is the originator of a stream can determine when to power-on its transmitter and for how long. Likewise, a node that is to receive a stream can "wake-up" only for the required duration of the CTP, powering down and saving battery power for the remainder of time. The last row 805 of the scheduling element denotes a broadcast transmission originating from the medium coordinator, with a duration of 0. This is interpreted by recipients as the end of the scheduled CTP duration, and that they must power-on their receivers until the next Signal-startCTP frame 205 is received.

During the CTP period, if a node detects errors in its transmission as a result of bad medium conditions or otherwise, it may dynamically request the medium coordinator for supplementary bandwidth in the form of additional medium grants. The medium coordinator 101 can then decide to service these nodes by issuing supplementary medium grants by an appropriate signaling frame, which will take a format similar to the schedule element, depicted in FIG. 8. The total duration of the supplementary medium grants must not exceed the total savings in bandwidth 704. At the end of the supplementary grants (or at the end of the CTP, if no supplementary grants are issued), the medium coordinator sends out a Signal-stopCTP 206, which is a broadcast frame announcing the end of the CTP duration and the start of the RTP duration.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionality equivalent structures, methods and uses, such as are within the scope of the appended claims.

What is claimed:

1. A method for a centralized coordinating node to schedule traffic in a network, requiring a stated level of quality of service, comprising:
   receiving stream specification requirements from a node wishing to initiate a traffic stream;
   performing stream admission control based on bandwidth requested by the node and resources available in the network;
   generating a traffic schedule based on a maximum duration available for the traffic requiring the quality of service, in the network having repeating frame durations comprising a period for the transmission of time bounded repetitive traffic and a period for randomly generated traffic;
   verifying conformance of a schedule based on the requirements of a maximum tolerable interval between medium grants, for all traffic streams;
   computing a reduction of required duration for coordinated transmission of traffic in a network frame and optimizing the schedule;
   broadcasting schedule information to all stations at a start of every network frame;
   computing a time required during each network frame for serving the traffic stream based on information specific to the network, including frame length and overheads associated with transmission, and parameters describing characteristics of the traffic stream;
   comparing required resources associated with the traffic stream with the available network resources to determine whether the traffic stream can be admitted;
   computing an integer number of medium grants of a maximum duration required during each network frame, to serve the traffic stream; and
   computing an actual transmission time using the integer number, accounting for a transmission rate, physical layer overheads, and a retransmission compensation factor.

2. A method for a centralized coordinating node to schedule traffic in a network, requiring a stated level of quality of service, comprising:
   receiving stream specification requirements from a node wishing to initiate a traffic stream;
   performing stream admission control based on bandwidth requested by the node and resources available in the network;
   generating a traffic schedule based on a maximum duration available for the traffic requiring the quality of service, in the network having repeating frame durations comprising a period for the transmission of time bounded repetitive traffic and a period for randomly generated traffic;
   verifying conformance of a schedule based on the requirements of a maximum tolerable interval between medium grants, for all traffic streams;
   computing a reduction of required duration for coordinated transmission of traffic in a network frame and optimizing the schedule;
   broadcasting schedule information to all stations at a start of every network frame;
   computing a minimum number of medium grants required to serve the traffic stream, based on a maximum duration of a medium grant for the network;

rounding up the minimum number of medium grants required for each traffic stream in a manner to minimize an increase in the minimum number of medium grants required for each traffic stream, wherein the rounding yields a set of numbers that are factors of a largest minimum number of medium grants required to serve all traffic streams;

dividing a portion of the frame available for coordinated transmissions into uniform grant intervals, based on a largest value of the number of medium grants required determined during the rounding; and allocating medium grants of different traffic streams to the grant intervals, while minimizing the variance in unutilized time of each of the grant intervals.

3. The method according to claim 2, the dividing further comprising:

computing a global parameter of the grant intervals, defined as the period between recurrence of successive medium grants for the traffic stream having a largest number of medium grants in a network frame, using parameters comprising:

a maximum duration in the network frame available for coordinated transmissions, and the maximum value of the medium grants required per network frame for all traffic streams.

4. The method according to claim 2, the allocating further comprising:

creating a data structure to track available duration, in units of time, within each grant interval;

allocating medium grants to different grant intervals in a periodic manner, while minimizing the variance between the un-utilized time in each grant interval, using the data structure to track the resources available in each grant interval; and wherein, when medium grants cannot be allocated for a particular traffic stream, the value of medium grants required per grant interval for the particular traffic stream is rounded up to a next highest factor of a maximum value of the minimum number of medium grants required to serve all traffic streams, and again attempting to allocate the medium grants to different grant intervals.

5. The method according to claim 4, wherein the data structure comprises a vector comprising a number of elements corresponding to a number of grant intervals that the coordinated transmission period of each network frame is divided into, each element being initialized to the duration of the computed grant interval.

6. The method according to claim 4, the allocation of medium grants, further comprising:

computing a stream specific parameter of the grant allocation interval, wherein the stream specific parameter of the grant allocation interval is a periodicity in terms of grant intervals with which medium grants need to be allocated for a particular traffic stream, and wherein input parameters are the medium grants required per network frame for all admitted traffic streams.

7. A method for a centralized coordinating node to schedule traffic in a network, requiring a stated level of quality of service, comprising:

receiving stream specification requirements from a node wishing to initiate a traffic stream;

performing stream admission control based on bandwidth requested by the node and resources available in the network;

generating a traffic schedule based on a maximum duration available for the traffic requiring the quality of service, in the network having repeating frame durations comprising a period for the transmission of time bounded repetitive traffic and a period for randomly generated traffic;

verifying conformance of a schedule based on the requirements of a maximum tolerable interval between medium grants, for all traffic streams;

computing a reduction of required duration for coordinated transmission of traffic in a network frame and optimizing the schedule;

broadcasting schedule information to all stations at a start of every network frame;

computing a difference between a maximum medium grant interval, and a duration between a last medium grant in the wireless network frame to a first medium grant of the same traffic stream in a next frame, as determined by the scheduling of medium grants; and determining if any of the values in the difference between the maximum medium grant interval and the duration between a last medium grant are negative, indicating that stream requirements on the maximum medium grant interval of the traffic stream is being violated, wherein a requesting traffic stream cannot be admitted.

8. A method for a centralized coordinating node to schedule traffic in a network, requiring a stated level of quality of service, comprising:

receiving stream specification requirements from a node wishing to initiate a traffic stream;

performing stream admission control based on bandwidth requested by the node and resources available in the network;

generating a traffic schedule based on a maximum duration available for the traffic requiring the quality of service, in the network having repeating frame durations comprising a period for the transmission of time bounded repetitive traffic and a period for randomly generated traffic;

verifying conformance of a schedule based on the requirements of a maximum tolerable interval between medium grants, for all traffic streams;

computing a reduction of required duration for coordinated transmission of traffic in a network frame and optimizing the schedule;

broadcasting schedule information to all stations at a start of every network frame;

computing an upper-bound on a possible reduction of a coordinated transmission period using a computed difference between a maximum medium grant interval, and a duration between a last medium grant in a network frame to a first medium grant of the same traffic stream in a next frame, as determined by the scheduling of medium grants computing an upper-bound on a maximum reduction in time per grant interval;

determining an actual reduction per grant interval as the minimum of all elements in a data structure to track available duration within each grant interval after scheduling has been performed, and the upper-bound on the maximum reduction in time per grant interval is determined; and reducing grant intervals by the actual reduction per grant interval and rescheduling the medium grants allocated the traffic streams.

9. The method according to claim 8, further comprising:

announcing the optimized schedule arrived at by the medium coordinator, the optimized schedule comprising:

a source address of the traffic streams;

a relative time of medium grants;
a duration of medium grants; and
a destination address of the traffic stream.

10. The method according to claim 9, wherein nodes in the network can perform timing synchronization by adjusting their local clocks on receipt of broadcast frames transmitted by the medium coordinator, comprising the frames containing the optimized schedule.

11. The method according to claim 9, further comprising using the optimized schedule in a power saving mode, comprising:
   transmitting the optimized schedule from the medium coordinator as part of a Signal-startCTP packet, signaling a start of a new network frame;
   determining at each node, based on a received optimized schedule, when the node must wake-up to transmit and when the node is due to receive a transmission during the coordinated transmission period, so that during a remainder of the coordinated transmission period, the node may operate in the power saving mode; and
   wherein a last entry of the schedule can be used by the medium coordinator to inform all nodes to power-on receivers of the nodes until a next schedule is received.

12. The method according to claim 8, further comprising having the nodes dynamically request additional bandwidth from the medium coordinator, by:
   sending a supplementary bandwidth request frame to the medium coordinator during a granted medium grant;
   wherein the medium coordinator selectively grants a supplementary medium grant to the requesting station depending on an extent of reduction in the coordinated transmission period obtained by the optimization of the schedule.

13. A method for a centralized coordinating node to schedule traffic in a network, requiring a stated level of quality of service, comprising:
   receiving stream specification requirements from a node wishing to initiate a traffic stream;
   performing stream admission control based on bandwidth requested by the node and resources available in the network;
   generating a traffic schedule based on a maximum duration available for the traffic requiring the quality of service, in the network having repeating frame durations comprising a period for the transmission of time bounded repetitive traffic and a period for randomly generated traffic;
   verifying conformance of a schedule based on the requirements of a maximum tolerable interval between medium grants, for all traffic streams;
   computing a reduction of required duration for coordinated transmission of traffic in a network frame and optimizing the schedule;
   broadcasting schedule information to all stations at a start of every network frame;
   computing an integer number of medium grants of maximum duration required during each network frame, to serve the traffic stream; and
   computing an actual transmission time using the integer number, accounting for a transmission rate, physical layer overheads, and a retransmission compensation factor.

* * * * *